United States Patent
Kho et al.

(10) Patent No.: US 11,291,076 B2
(45) Date of Patent: Mar. 29, 2022

(54) METHOD, APPARATUS AND SYSTEM FOR ESTABLISHING SESSION FOR COMMUNICATION WITH LOCAL NETWORK IN WIRELESS COMMUNICATION SYSTEM

(71) Applicant: Samsung Electronics Co., Ltd., Suwon-si (KR)

(72) Inventors: Youngsung Kho, Suwon-si (KR); Moonyoung Jeong, Suwon-si (KR); Jaehyun Hwang, Suwon-si (KR); Joonseo Lee, Suwon-si (KR); Kyuho Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 16/965,757

(22) PCT Filed: Jan. 29, 2019

(86) PCT No.: PCT/KR2019/001221
§ 371 (c)(1),
(2) Date: Jul. 29, 2020

(87) PCT Pub. No.: WO2019/151745
PCT Pub. Date: Aug. 8, 2019

(65) Prior Publication Data
US 2021/0037597 A1   Feb. 4, 2021

(30) Foreign Application Priority Data

Jan. 30, 2018 (KR) .................. 10-2018-0011409

(51) Int. Cl.
*H04W 72/04* (2009.01)
*H04W 80/10* (2009.01)
*H04W 76/12* (2018.01)

(52) U.S. Cl.
CPC ........... *H04W 80/10* (2013.01); *H04W 72/04* (2013.01); *H04W 76/12* (2018.02)

(58) Field of Classification Search
CPC ..... H04W 72/04; H04W 88/08; H04W 76/00; H04W 80/10; H04W 76/12; H04W 88/06
See application file for complete search history.

(56) References Cited

U.S. PATENT DOCUMENTS 4,285,005 A * 8/1981 Srivastava ............. H04N 9/643
348/652
8,634,346 B2   1/2014 Velandy et al.
(Continued)

FOREIGN PATENT DOCUMENTS

EP   3 490 333 A1   5/2019
EP   3 703 399 A1   9/2020
(Continued)

OTHER PUBLICATIONS

LG Electronics: "TS 23.501: Editorial 1-15 update (Note numbering, non-breaking space, Style, etc.)", 3GPP Draft; S2-176825, Sep. 18, 2017, XP051349435.
(Continued)

*Primary Examiner* — Hassan A Phillips
*Assistant Examiner* — Prenell P Jones
(74) *Attorney, Agent, or Firm* — Jefferson IP Law, LLP

(57) ABSTRACT

Provided is a method of establishing a session for communication with a local network in a wireless communication system, the method including obtaining a request for using an integrated mode in which a user plane entity of a base station uses an integrated user plane entity that performs an operation of a user plane function (UPF) together, when a session between a local network and a user equipment (UE) is established, determining based on user information of the UE whether to accept use of an integrated mode, selecting
(Continued)

the integrated user plane entity as a user plane entity in which the session is to be established, based on a result of the determining, and transmitting a session establishment request to the selected integrated user plane entity.

16 Claims, 12 Drawing Sheets

(56) References Cited

U.S. PATENT DOCUMENTS

| | | | | |
|---|---|---|---|---|
| 10,230,318 B2* | 3/2019 | Yoo | ............ | H02P 21/14 |
| 10,432,518 B2* | 10/2019 | Rasanen | ............ | H04L 41/5054 |
| 10,568,007 B2* | 2/2020 | Park | ............ | H04W 36/30 |
| 10,582,559 B2 | 3/2020 | Cho et al. | | |
| 2006/0061405 A1* | 3/2006 | Zerbe | ............ | G11C 7/02 327/336 |
| 2017/0085202 A1* | 3/2017 | Yoo | ............ | H02P 21/14 |
| 2018/0032997 A1* | 2/2018 | Gordon | ............ | G06Q 30/0269 |
| 2019/0021064 A1 | 1/2019 | Ryu et al. | | |
| 2019/0028887 A1* | 1/2019 | Ryu | ............ | H04W 48/06 |
| 2019/0037636 A1 | 1/2019 | Kim et al. | | |
| 2019/0158408 A1* | 5/2019 | Li | ............ | H04L 47/20 |
| 2020/0029388 A1* | 1/2020 | Dao | ............ | H04W 76/34 |
| 2020/0314950 A1* | 10/2020 | Dao | ............ | H04W 36/0016 |
| 2020/0329450 A1* | 10/2020 | Youn | ............ | H04W 76/30 |
| 2021/0105753 A1* | 4/2021 | Zhang | ............ | H04L 5/0048 |
| 2021/0211960 A1* | 7/2021 | Ryu | ............ | H04W 36/14 |
| 2021/0288842 A1* | 9/2021 | Chatterjee | ............ | H04L 5/0094 |

FOREIGN PATENT DOCUMENTS

| | | |
|---|---|---|
| EP | 3 720 160 A1 | 10/2020 |
| WO | 2017/078258 A1 | 5/2017 |
| WO | 2017/142362 A1 | 8/2017 |
| WO | 2018/006221 A1 | 1/2018 |
| WO | 2018/008944 A1 | 1/2018 |

OTHER PUBLICATIONS

Extended European Search Report dated Jan. 12, 2021, issued in European Patent Application No. 19748261.5.
3GPP TS 23.502, 3rd Generation Partnership Project; Technical Specification Group Services and System Aspects Procedures for the 5G System; Stage 2 (Release 15), 3GPP TS 23.502 V15.0.0, Dec. 22, 2017.
International Search Report dated Apr. 29, 2019, issued in International Patent Application No. PCT/KR2019/001221.
CMCC, Discussion on RAN support of edge computing in NR, 3GPP TSG RAN WG2 #AHS, 3GPP, R2-1800808, Jan. 12, 2018.
Korean Office Action dated Sep. 30, 2021, issued in Korean Patent Application No. 10-2018-0011409.
Samsung, 3GPP S2-179385_23.502 Service Request Procedure Update for LADN mobility events, SA WG2 Meeting #S2-124, Nov. 27-Dec. 1, 2017, Reno, NV, USA.
Nokia et al., 3GPP S2-181375_23.726 KI SMG area_v2, FS_ETSUN / 23.726 Key Issue: Support of the preservation of a PDU Session while the UE moves out of an SMF service area, SA WG2 Meeting #125, Jan. 22-26, 2018, Gothenburg, Sweden.
Korean Office Action dated Jan. 20, 2022, issued in Korean Patent Application No. 10-2018-0011409.

* cited by examiner

METHOD, APPARATUS AND SYSTEM FOR ESTABLISHING SESSION FOR COMMUNICATION WITH LOCAL NETWORK IN WIRELESS COMMUNICATION SYSTEM

TECHNICAL FIELD

The present disclosure relates to a method, an apparatus, and a system for establishing a session, and more particularly, to a method of establishing a session for communication with a local network.

BACKGROUND ART

To meet the soaring demand with respect to wireless data traffic because of the commercialization of $4^{th}$-generation (4G) communication systems, efforts have been made to develop improved communication systems. To achieve higher data transmission rates, implementation of developing communication systems in ultra-high frequency bands millimeter wave (mmWave), such as, e.g., 60 GHz, is being considered. In the improved communication systems, beamforming, massive multi-input multi-output (MIMO), full dimensional MIMO (FD-MIMO), array antenna, analog beamforming, and large-scale antenna technologies have been discussed as ways of alleviating propagation path loss and increasing propagation distances in ultra-high frequency bands. For communication system network improvement, in 5G communication systems, technologies such as evolved small cell, advanced small cell, cloud radio access network (RAN), ultra-dense network, device to device (D2D) communication, wireless backhaul, moving network, cooperative communication, coordinated multi-points (CoMPs), and interference cancellation have been developed. Also, for 5G systems, other technologies have been developed, such as, hybrid frequency-shift keying (FSK) and quadrature amplitude modulation (QAM) modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

Moreover, in recently developed 4G communication systems and 5G communication systems (beyond 4G systems and pre-5G systems), a fixed wireless access (FWA) service replacing an existing wired period with a wireless period is prepared to be provided. The FWA may optimize performance while simplifying a role of a core network, for a customer premises equipment (CPE) that is a user equipment with low mobility.

That is, to process explosively increasing data, new techniques for achieving higher communication efficiency have been introduced for a radio access network and a core network.

As wireless communication systems have become able to provide more varied services with the introduction of the foregoing techniques, ways of smoothly providing such services are required.

DESCRIPTION OF EMBODIMENTS

Technical Problem

The present disclosure provides a method of efficiently establishing a communication session with a local network.

Solution to Problem

The present disclosure provides a method of establishing a communication session with a local network in a wireless communication system.

Advantageous Effects of Disclosure

The present disclosure may efficiently establish a communication session with a local network.

BEST MODE

Figure 1:
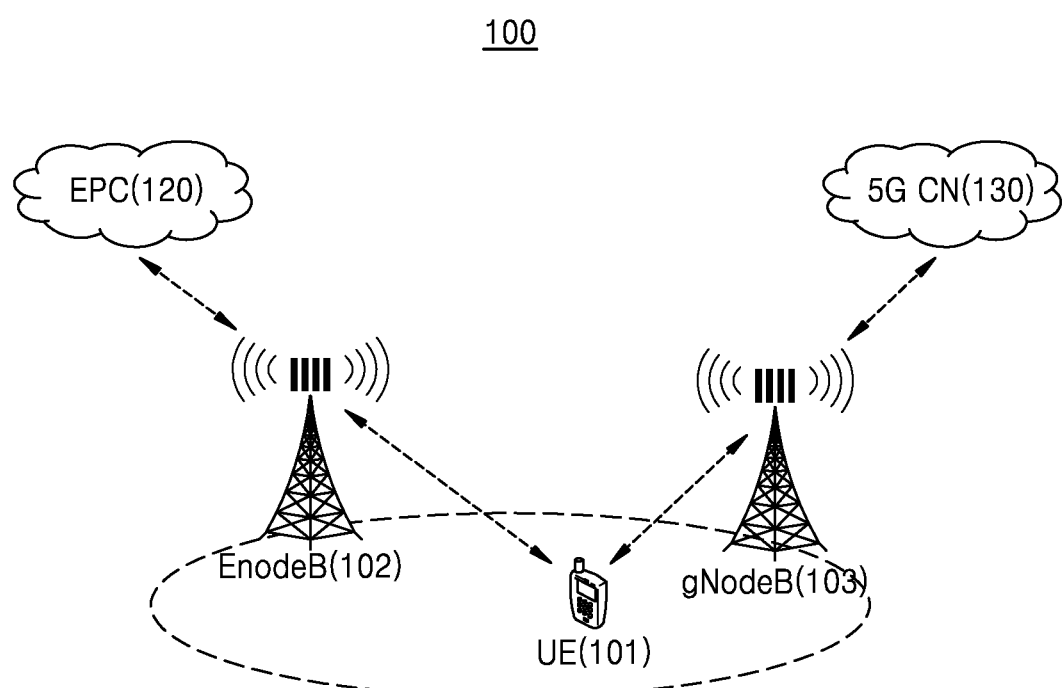
FIG. 1 is a diagram for describing a structure of a communication system according to some embodiments.

According to some embodiments, a method of establishing a session for communication with a local network in a wireless communication system includes obtaining a request for using an integrated mode in which a user plane entity of a base station uses an integrated user plane entity that performs an operation of a user plane function (UPF) together, when a session between a local network and a user equipment (UE) is established, determining, based on user information of the UE, whether to accept use of an integrated mode, selecting the integrated user plane entity as a user plane entity in which the session is to be established, based on a result of the determining, and transmitting a session establishment request to the selected integrated user plane entity.

The request for using the integrated mode may include at least one of identification information of the integrated user plane entity or a session establishment request between the local network and the UE.

The obtaining of the request for using the integrated mode may include receiving the request for using the integrated mode from an access management function (AMF) having received the request for using the integrated mode from the base station.

The method may further include receiving resource allocation information regarding the established session from the integrated user plane entity.

The transmitting of the session establishment request to the selected integrated user plane entity may include providing the resource allocation information to the AMF, upon receiving the resource allocation information from the integrated user plane entity.

The selecting of the integrated user plane entity may include selecting the integrated user plane entity based on at least one of a name of the local network, the identification information of the integrated user plane entity, or a tracking area (TA) of the UE.

According to some embodiments, there is provided a computer-readable recording medium having recorded thereon a program for executing the method on a computer.

According to some embodiments, a method of establishing a session for communication with a local network in a wireless communication system includes receiving a session establishment request for communication with a local network from a UE, determining based on the session establishment request whether a user plane entity of a base station is an integrated user plane entity that performs an operation of a UPF together, transmitting a request for using an integrated mode in which the integrated user plane entity is used, to an AMF, based on the determining, when the session is established, and establishing the session for communication with the local network through the integrated user plane entity determined according to selection of a session management function (SMF) having received the request for using the integrated mode, from the AMF.

The request for using the integrated mode may include at least one of identification information of the integrated user plane entity or a session establishment request between the local network and the UE.

The method may further include generating a radio bearer in a module of the integrated user plane entity in which the session is established, the radio bearer transmitting and receiving the session for communication between the UE and the local network.

The method may further include transmitting resource allocation information regarding the established session to the SMF.

According to some embodiments, there is provided a computer-readable recording medium having recorded thereon a program for executing the method on a computer.

According to some embodiments, an SMF for establishing a session for communication with a local network in a wireless communication system includes a transceiver configured to obtain a request for using an integrated mode in which a user plane entity of a base station uses an integrated user plane entity that performs an operation of a UPF together, when a session between a local network and a UE is established, and to transmit a session establishment request to a selected integrated user plane entity, and a processor configured to determine whether to accept use of the integrated mode, based on user information of the UE, and to select the integrated user plane entity as a user plane entity in which the session is to be established, based on a result of the determining.

The request for using the integrated mode may include at least one of identification information of the integrated user plane entity or a session establishment request between the local network and the UE.

The transceiver may be further configured to receive the request for using the integrated mode from an AMF having received the request for using the integrated mode from the base station.

The transceiver may be further configured to receive resource allocation information regarding the established session from the integrated user plane entity.

The transceiver may be further configured to provide the resource allocation information to the AMF, upon receipt of the resource allocation information from the integrated user plane entity.

The processor may be further configured to select the integrated user plane entity based on at least one of a name of the local network, the identification information of the integrated user plane entity, or a tracking area (TA) of the UE.

According to some embodiments, a base station for establishing a session for communication with a local network in a wireless communication system includes a transceiver configured to receive a session establishment request for communication with a local network from a UE and to transmit a request for using an integrated mode in which an integrated user plane entity is used, to an AMF, when the session is established, and a processor configured to determine based on the session establishment request whether a user plane entity of a base station is an integrated user plane entity that performs an operation of a UPF together, and to establish the session for communication with the local network through the integrated user plane entity determined according to selection of a SMF having received the request for using the integrated mode from the AMF.

The request for using the integrated mode may include at least one of identification information of the integrated user plane entity or a session establishment request between the local network and the UE.

The processor may be further configured to generate a radio bearer in a module of the integrated user plane entity in which the session is established, the radio bearer transmitting and receiving the session for communication between the UE and the local network.

MODE OF DISCLOSURE

Hereinafter, embodiments of the present disclosure will be disclosed with reference to the accompanying drawings.

When embodiments of the present disclosure are described, technical matters that are well known in a technical field of the present disclosure and are not directly related to the present disclosure will not be described. By omitting an unnecessary description, the subject matter of the disclosure will be more clearly described without being obscured.

For the same reason, some elements will be exaggerated, omitted, or simplified in the attached drawings. The size of each element does not entirely reflect the actual size of the element. In each drawing, an identical or corresponding element will be referred to as an identical reference numeral.

Advantages and features of the present disclosure and a method for achieving them will be apparent with reference to embodiments described below together with the attached drawings. However, the present disclosure is not limited to the disclosed embodiments, but may be implemented in various manners, and the embodiments are provided to complete the disclosure of the present disclosure and to allow those of ordinary skill in the art to understand the scope of the present disclosure. The present disclosure is defined by the category of the claims. Throughout the specification, an identical reference numeral will indicate an identical element.

It will be understood that each block of the flowchart and/or block diagram illustrations, and combinations of blocks in the flowchart and/or block diagram illustrations, may be implemented by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function (s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

The term '~unit' used herein refers to software or a hardware element such as a field-programmable gate array (FPGA), an application specific integrated circuit (ASIC), etc., and '~unit' plays specific roles. However, the meaning of '~unit' is not limited to software or hardware. '~unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more CPUs in a device or a secure multimedia card. In the embodiments, '~unit' may include one or more processors.

As used in the following description, a term for identifying an access node, terms referring to network entities, terms referring to messages, a term referring to an interface between network objects, and terms referring to various identification information are illustrated for convenience of explanation. Therefore, the disclosure is not limited by the following terms, and other terms indicating targets having equivalent technical meanings may be used.

Hereinbelow, for convenience of a description, the present disclosure employs terms and names defined in the $3^{rd}$-Generation Partnership Project Long Term Evolution (3GPP LTE) standards or terms and names changed based on them. However, the present disclosure is not limited by such terms and names, and may be equally applied to systems complying with other standards.

Throughout the specification, a user terminal may refer to a user equipment (UE). The UE may include a personal computer (PC), a cellular phone, a smart phone, a television (TV), a tablet, a laptop, a personal digital assistant (PDA), a portable multimedia player (PMP), a navigation system, an MP3 player, a digital camera, a black box, a vehicle-mounted device, a module included in a vehicle-mounted device, a vehicle, etc. However, the UE is not limited to the foregoing examples, and may include various devices.

Throughout the specification, a session may refer to a flow of data generated by coupling between wireless communication devices capable of exchanging data. That is, the session may mean logical connection for communication between devices in a network environment and will not be described in detail because of obviousness to those of ordinary skill in the art.

Throughout the specification, an entity may refer to a component in a system or a program. The entity may have the same meaning as a component, an element, an entity, and a subject, and may be used for the same meaning as a function when it is identified by a function. For example, in a communication system, an entity may mean a component that performs a specific function in a network, such as a gateway, a mobility management entity (MME), an access management function (AMF), etc. Needless to say, the disclosure is not limited to the example.

Throughout the specification, a user plane entity (UPF) may refer to a component that delivers and processes user data (e.g., a packet a flow, traffic, etc.) in a network, and may include, but not limited to, for example, a user plane gateway (GW UP or GW-U), a user plane function (UPF), and a user plane entity of a base station (a radio access network (RAN)-user plane (UP)).

Throughout the specification, a control plane entity (CPF) may refer to a component that delivers and processes control data (e.g., a packet a flow, traffic, etc.) in a network, and may include, but not limited to, for example, a control plane gateway (GW CP or GW-C), a session management function (SMF), and a control plane entity of a base station (a RAN-control plane (CP)).

Throughout the specification, an integrated user plane entity may refer to an entity in which a user plane entity of a RAN such as a base station and a user plane entity of a core network (CN) such as a UPF are integrated. The integration may mean, but not limited to, that one entity includes two or more entities, one entity performs operations of two or more entities, or one entity includes components of two or more entities.

Throughout the specification, a local network may refer to a network including a local server. For example, the local network may mean a server for a local service provided by a communication service provider or a server for a local service provided by a communication service provider. Needless to say, the disclosure is not limited to the example.

According to some embodiments, the local network may mean a network or a server capable of transmitting and receiving data without passing through an entity of a CN, and a central network may mean a network or a server capable of transmitting and receiving data through an entity of a CN.

Throughout the specification, traffic may refer to data to be transmitted and received. According to some embodiments, the data to be transmitted and received may have a packet form. Needless to say, the disclosure is not limited to the example.

FIG. 1 is a diagram for describing a structure of a communication system according to some embodiments.

FIG. 1 illustrates a structure of two communication systems including Long Term Evolution (LTE) and $5^{th}$-Generation (5G) communication systems. Referring to FIG. 1, a user equipment (UE) 101 may use both an LTE communication scheme and a 5G communication scheme. When the UE 101 uses the LTE communication scheme, the UE 101 may be connected with an LTE base station, an evolved NodeB (eNodeB) 102 that may be connected with a CN of an LTE communication system, an evolved packet core (EPC).

When the UE 101 uses a next-generation mobile communication scheme, a new radio (NR) communication scheme, the UE 101 may be connected with a next-generation base station, a gNodeB 103 that may be connected with a CN of an NR communication system, a 5G Core. The NR system may also be called as a 5G system, and hereinbelow, 5G and NR may be used interchangeably.

While it is illustrated in FIG. 1 that the LTE communication system and the NR communication system exist separately, this illustration is merely an example for convenience of a description, and it would be obvious to those of ordinary skill in the art that the NR communication system and the LTE communication system may interwork with each other. According to some embodiments, the UE may use the NR communication system and the LTE communication system together, and the UE may use the NR communication system and the LTE communication system at the same time by using a function such as LTE-NR dual connectivity.

According to some embodiments, connection between the UE 101 and the eNodeB 102 and gNodeB 103 may be referred to as an RAN, and the eNodeB 102 and the gNodeB 103 may be connected with the CNs 120 and 130 and may connect to a data network (e.g., a data server, Internet, etc.) through data processing of entities in the CNs 120 and 130.

According to some embodiments, in an LTE or NR communication system, all user traffic is served through a shared channel, requiring a device that collects state information of the UE 101, such as a buffer state, an available transmission power state, a channel state, etc., and performs scheduling, in which the eNodeB 102 or the gNodeB 1a103 may be responsible for these functions. One eNodeB 102 or gNodeB 1a103 may generally control multiple cells, and may apply a radio access technique or a beamforming technique for orthogonal frequency division multiplexing (OFDM). The eNodeB 102 or gNodeB 1a103 may also apply an adaptive modulation & coding (AMC) in which a modulation scheme and a channel coding rate are determined based on a channel state.

According to some embodiments, the CN 120 or 130 may enable transmission and reception of traffic by establishing and managing a session with an external network. For example, various entities in the CN 120 or 130 may perform various operations to allow the UE 101 to communicate with an external network, such as supporting mobility of the UE 101, establishing a session, setting a quality of service (QoS), etc. Entities included in the CN 120 or 130 will be described in detail with reference to FIGS. 2 and 3.

Figure 2:
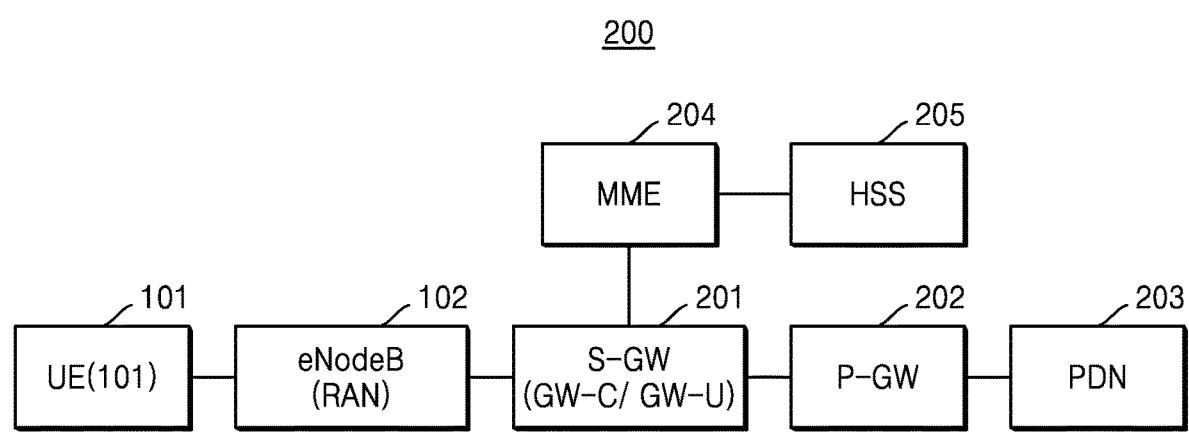
FIG. 2 illustrates architecture of a radio access network (RAN) and an evolved packet core (EPC) in a Long Term Evolution (LTE) communication system, according to some embodiments.

FIG. 2 illustrates an architecture of a RAN and an EPC in an LTE communication system 200, according to some embodiments.

The LTE communication system 200 is not limited to an example illustrated in FIG. 2, and may include entities that are more or less than those shown in FIG. 2.

According to some embodiments, the UE 101 may include various devices capable of using a communication system as described above, and may include a module capable of authenticating and identifying a subscriber of a communication system.

According to some embodiments, the eNodeB 102 may provide wireless connection between the UE 101 and the CN, and collect state information of the UE 101, such as a buffer state, an available transmission power state, a channel state, etc., and perform scheduling as described above.

According to some embodiments, connection between the UE 101 and the eNodeB 102 may be referred to as an RAN, and the other part (e.g., a serving gateway (S-GW), a packet data network (PDN)-gateway (P-GW), etc.,) except for connection between the UE 101 and the eNodeB 102 may be referred to as a CN. As described above, the CN of the LTE communication system may be referred to as an EPC.

According to some embodiments, an S-GW 201 may be an entity that forwards data (or a data packet) and may be a user plane entity. The S-GW 201 may be a reference point (i.e., an anchor point) in a handover with the eNodeB 102 or another communication network. The S-GW 201 may be intuitively construed from a name thereof by those of ordinary skill in the art, and thus will not be described in detail.

According to some embodiments, a P-GW 202 may be an entity that provides connectivity between the UE 101 and a PDN 203 that is an external network. For example, the P-GW 202 may assign an Internet protocol (IP) address to the UE 101, may be a reference point in a handover with the S-GW 201, and may apply a QoS control policy and check a usage volume for charging. The P-GW 202 may be intuitively construed from a name thereof by those of ordinary skill in the art, and thus will not be described in detail.

According to some embodiments, the S-GW 201 and the P-GW 202 may be functionally classified as a GW-C (GW CP) and a GW-U (GW UP), in which the GW-C may be a control plane entity and the GW-U may be a user plane entity.

According to some embodiments, the PDN 203 may mean an external network such as an Internet network, an external server, etc.

According to some embodiments, a mobility management entity (MME) 204 may authenticate the UE 101, manage a session such as a bearer, and a connectivity state of the UE 101. The MME 204 may be intuitively construed from a name thereof by those of ordinary skill in the art, and thus will not be described in detail.

According to some embodiments, a home subscriber server (HSS) 205 may be an entity including information for authenticating the UE 101, and may store QoS level information (e.g., priority information, information about an available bandwidth, etc.). The HSS 205 may be intuitively construed from a name thereof by those of ordinary skill in the art, and thus will not be described in detail.

Although not shown in FIG. 2, an EPC, which is a CN of an LTE communication system, may further include an entity such as a policy and charging rule function (PCRF), a subscriber profile repository (SPR), an online charging system (OCS), or an offline charging system (OFCS). The PCRF (not shown) may be an entity that determines a charging policy and a QoS policy to be applied to the UE 101, and the SPR (not shown) may be an entity that stores the charging policy and the QoS policy determined by the PCRF. The OCS (not shown) and the OFCS (not shown) may be entities that manage the usage volume and charging. Entities included in a CN may be intuitively construed from names thereof by those of ordinary skill in the art, and thus will not be described in detail.

According to some embodiments, each entity may perform communication by using a specific interface. For example, communication may be performed between the eNodeBs 102 using an X2 interface, and between the eNodeB 102 and the S-GW 201 using an S1 interface. Other entities may also perform communication using a specific interface. An interface for communication between entities may be obvious to those of ordinary skill in the art and thus will not be described in detail.

Figure 3:
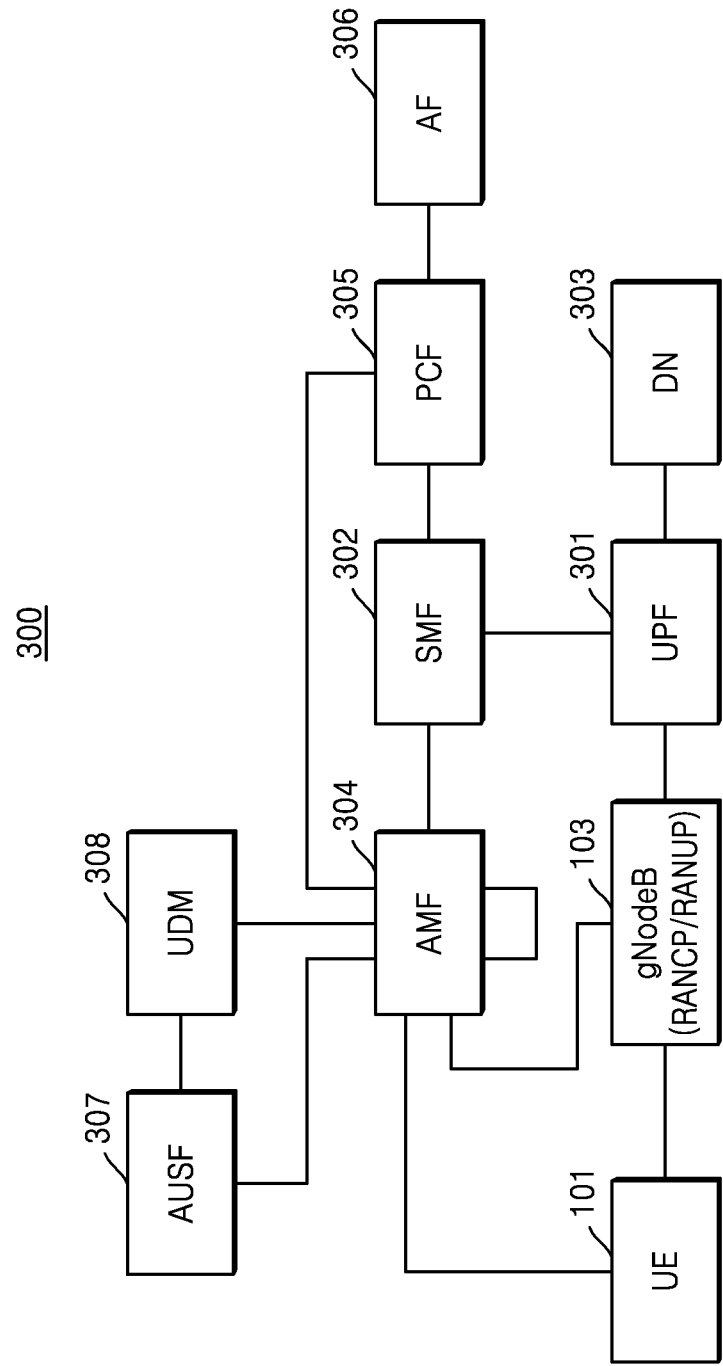
FIG. 3 illustrates architecture of a RAN and a core network (CN) of a $5^{th}$-generation (5G) communication system, according to some embodiments.

FIG. 3 illustrates an architecture of a RAN and a CN of a 5G communication system 300, according to some embodiments.

The 5G communication system 300 is not limited to an example illustrated in FIG. 3, and may include entities that are more or less than those shown in FIG. 3. In FIG. 3, the communication system may be illustrated as including entities distinguished based on network functions.

The UE 101 may correspond to the foregoing description and thus will not be described in detail.

According to some embodiments, the gNodeB 103 may correspond to the eNodeB 102 of the LTE communication system. The gNodeB 103 employing a 5G communication scheme may be a base station using a wireless communication technique that is the same as or different from LTE, and may provide a faster and more efficient service to a UE than that of the eNodeB 102. In the present specification, the base station may include both an eNodeB and a gNodeB.

According to some embodiments, the base station may be classified as a user plane entity or a control plane entity, based on a signal to be processed. The user plane entity of the base station may be referred to as a radio access network user plane (RAN UP), and the control plane entity of the base station may be referred to as a RAN CP.

According to some embodiments, a UPF 301 may be an entity that forwards user data, and may be a user plane entity.

According to some embodiments, an SMF 302 may be an entity that manages a session, and when the UE 101 has several sessions, to each of which the SMF 302 may be assigned to allow the UE 101 to be connected with at least one SMF 302. An AMF 304 may be an entity that manages access and mobility of the UE 101, in which the UE 101 may be connected with one AMF 304.

According to some embodiments, one AMF 304 may manage a plurality of SMFs 203 and one SMF 302 may manage a plurality of UPFs 301. According to some embodiments, the SMF 302 and the AMF 304 may control plane entities, and the UPF 301 and the SMF 302 may correspond to the GW-U and the GW-C described above with reference to FIG. 2.

According to some embodiments, a data network (DN) 303 may mean a data network, and may have a concept corresponding to the PDN of FIG. 2. The DN 303 may deliver a packet data unit (PDU) to be transmitted to the UE 101 to the UPF 301 and receive a PDU transmitted by the UE 101 through the UPF 301. The DN 303 may be a local network or a central network.

According to some embodiments, a policy control function (PCF) 305 may be an entity that determines a policy related to charging. An application function (AF) 306 may be an entity that provides information about a packet flow for guaranteeing a QoS.

According to some embodiments, an authentication server function (AUSF) 307 may be an entity that stores information for authentication of the UE 101, and unified data management (UDM) 308 may be an entity that stores information about a user. Entities included in a 5G CN may be intuitively construed from names thereof by those of ordinary skill in the art, and thus will not be described in detail.

According to some embodiments, each entity may perform communication by using a specific interface. For example, communication may be performed between the gNodeB 103 and the UPF 301 using an NG3 interface, and between the UPF 301 and the SMF 302 using an NG4 interface. Other entities may also perform communication using a specific interface. This would be obvious to those of ordinary skill in the art, and thus will not be described in detail.

According to some embodiments, when a UE has low mobility or desires to access a local server, roles of the entities shown in FIGS. 1 through 3 may be reduced largely. For example, when the terminal has low mobility or desires to access a local server, a role of at least one of the UPF 301 or the AMF 304 may be reduced. Thus, a more optimized structure may be required while complying with standard structure and function for efficient use of a CN.

Figure 4:
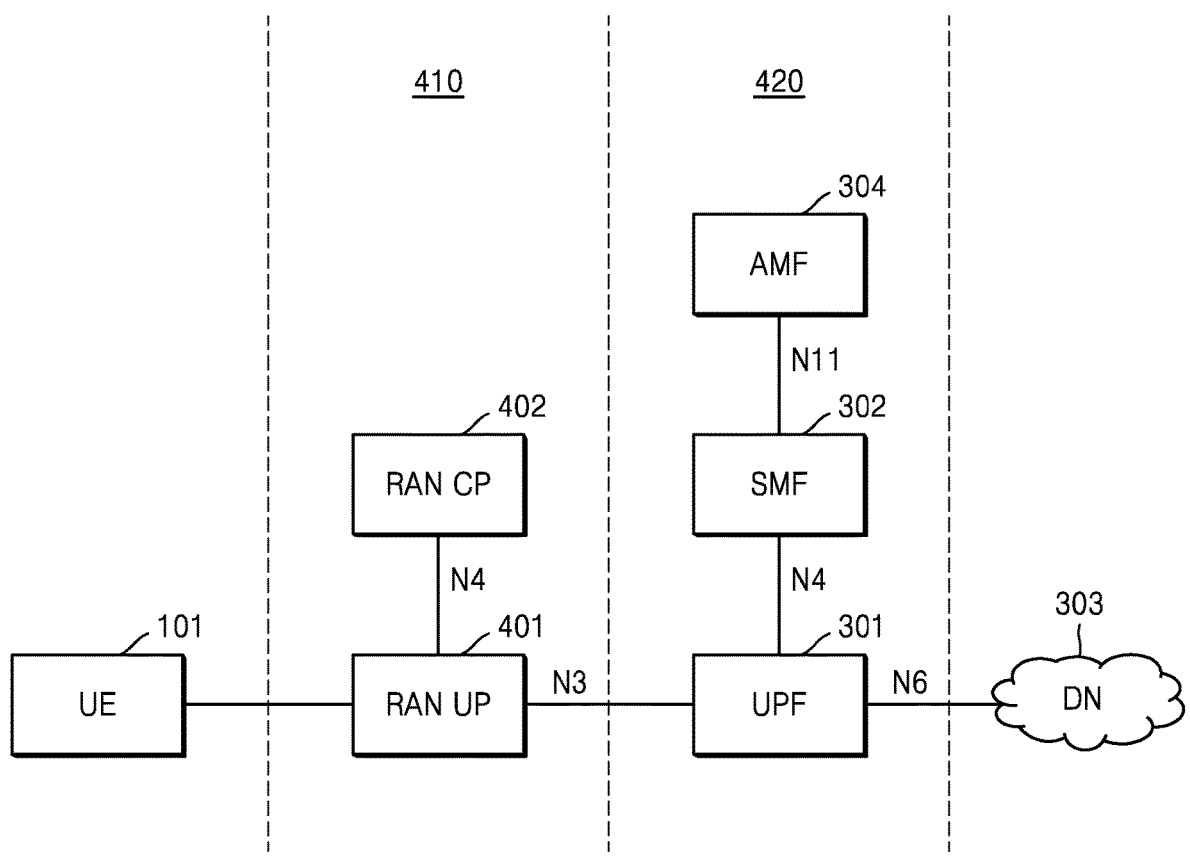
FIG. 4 illustrates a system for describing a method of establishing a session through a user plane function (UPF), according to some embodiments.

FIG. 4 illustrates a system for describing a method for establishing a session through a UPF, according to some embodiments.

Referring to FIG. 4, in a system 400 of FIG. 4, only some components of the 5G communication system 300 of FIG. 3 are illustrated, and the gNodeB 103 of FIG. 3 is shown as two entities: a user plane entity, an RAN UP 401 and a control plane entity, an RAN CP 402, and each connection node is indicated by a name of an interface used for communication between entities (e.g., N2, N3, N4, N6, N11, X3, etc.).

According to some embodiments, the RAN UP 401 and the RAN CP 402 may be referred to as a base station 410, and according to some embodiments, the UPF 301, the SMF 302, and the AMF 304 may be referred to as a CN 420, without being limited to these examples.

According to some embodiments, in the CN 420 shown in FIG. 4, entities that need to be described for a description of the present disclosure are shown, and it would be obvious to those of ordinary skill in the art that the CN 420 may include additional entities or less entities as described above.

According to some embodiments, the UE 101 may request the RAN CP 402 to establish a session for accessing the DN 303. The RAN CP 402 may receive a session establishment request and deliver information for establishing a session to the AMF 304 through an N2 interface.

According to some embodiments, the AMF 304 may select the SMF 302 for requested session establishment and management. That is, the AMF 304 may select one SMF 302 that is to process session establishment and management from among the plurality of SMFs 302. The AMF 304 may provide information about the session establishment request to the selected SMF 302.

According to some embodiments, the SMF 302 may select the UPF 301 that is to establish a session, based on the information about the session establishment request, obtained from the AMF 304. That is, the SMF 302 may also select one UPF 301 that is to establish a session from among the plurality of UPFs 301. The UPF 301 may determine a module that is to establish a session.

According to some embodiments, when the UPF 301 establishes a session between the UE 101 and the DN 303, the UE 101 may transmit and receive data to and from the DN 303 through the established session. The UPF 301 may forward user data received through the RAN UP 401 to the DN 303.

According to some embodiments, when the UE desires to access a local network, the CN 420 may deliver information about the local network to the UE 101 based on a current location of the UE 101 to reduce a delay between DNs and guarantee a QoS, such that the UPF 301 that falls within a specific range from or is closest to the local network may be selected.

In other words, when the UE accesses a local network or has low mobility, it may be preferable in terms of service providing that the UPF 301 is located in a location close to the RAN UP 401 or in the same data center as the RAN UP 401, and especially the present disclosure provides a method for establishing a session using an integrated user plane entity in which the UPF 301 and the RAN UP 401 are integrated into one to further improve communication efficiency. A method for establishing a session by using an integrated user plane entity will be described in detail with reference to FIG. 5.

Figure 5:
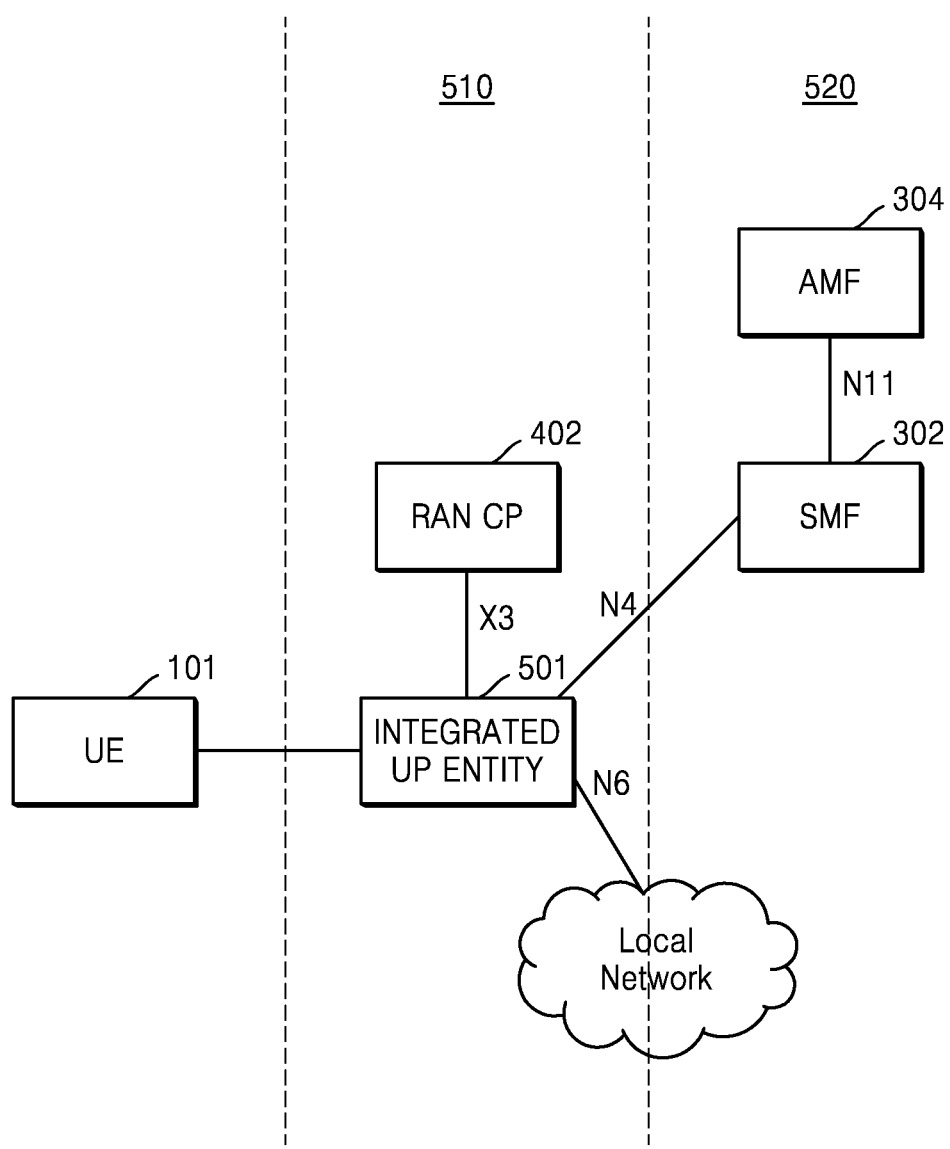
FIG. 5 illustrates a system for describing a method of establishing a session with a local network through an integrated user plane entity, according to some embodiments.

FIG. 5 illustrates a system for describing a method for establishing a session with a local network through an integrated user plane entity, according to some embodiments.

Referring to FIG. 5, in a system 500 of FIG. 5, an integrated user plane (UP) entity 501 is shown in place of the UPF 301 and the RAN UP 401 of FIG. 4. While the integrated UP entity 501 is illustrated as being included in a base station 510 in FIG. 5, the present disclosure is not limited to the example, and it would be obvious to those of ordinary skill in the art that the integrated UP entity 501 exists separately from the base station 510.

As described above, the RAN CP 402 may receive the session establishment request from the UE 101. When the UE 101 requests session establishment with a local network 502, the UE 101 may perform communication with the local network 502 by using the integrated UP entity 501. According to some embodiments, the local network 502 of FIG. 5, a network that is different from a central network, the DN 303 of FIG. 4, may be capable of performing communication without passing through an entity of a CN 520.

According to some embodiments, the AMF 304 may select the SMF 302 for requested session establishment and management. To establish a session through the integrated UP entity 501, the AMF 304 may have to select the SMF 302 that manages the integrated UP entity 501 from among the plurality of SMFs 302. The SMF 302 may also have to select the integrated UP entity 501 as a user plane entity for establishing a session.

To select a session through the integrated UP entity 501, both the RAN CP 402 and the SMF 302 need to select the integrated UP entity 501. That is, as the integrated UP entity 501 performs operations of two types of entities of the RAN UP 401 and the UPF 301, the RAN CP 402 and the SMF 302 need to select the integrated UP entity 501 as a user plane entity for establishing a session, instead of selecting the RAN UP 401 and the UPF 301.

Hereinbelow, a detailed description will be made of a method for selecting the integrated UP entity 501 and a method for establishing a session in a base station including the RAN CP 402 and the CN including the SMF 302.

Figure 6:
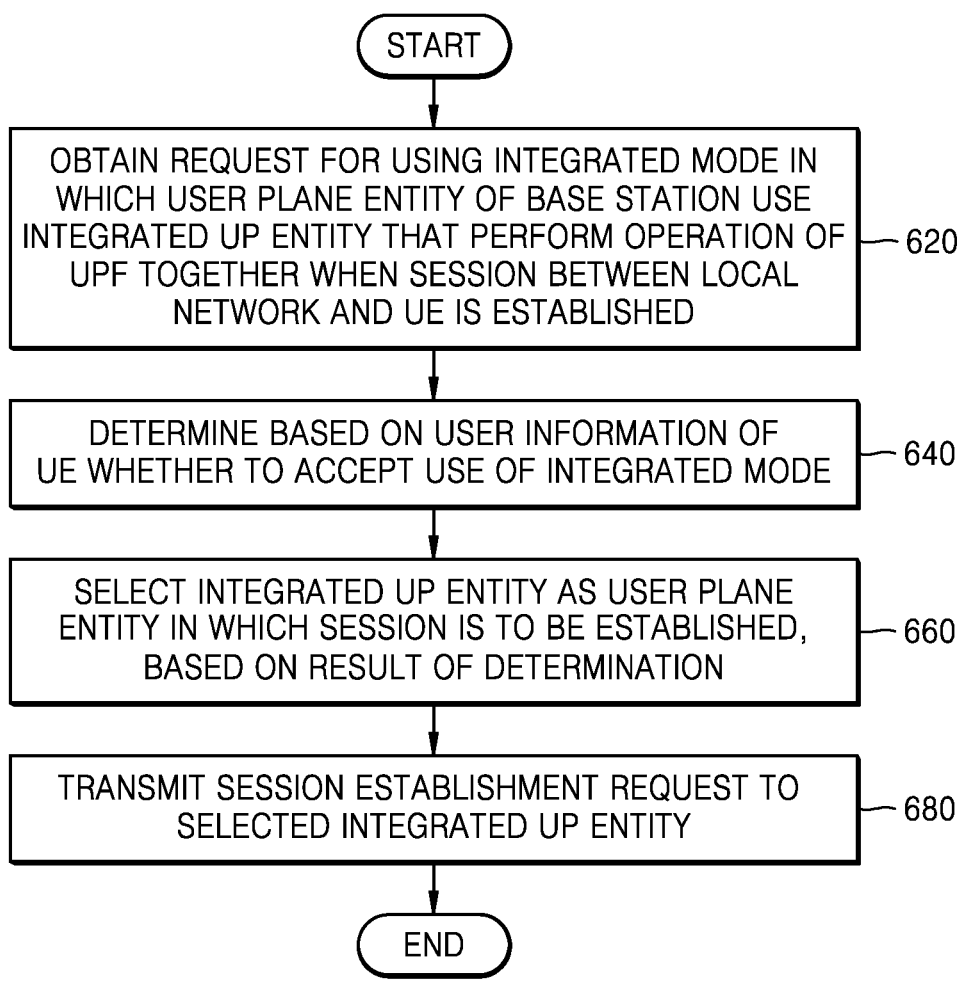
FIG. 6 is a flowchart of a method of establishing a session with a local network of a session management function (SMF), according to some embodiments.

FIG. 6 is a flowchart of a method for establishing a session with a local network of an SMF, according to some embodiments.

In operation 620, the SMF may obtain a request for using an integrated mode in which a user plane entity of a base station uses an integrated UP entity that performs an operation of a UPF together, when the SMF establishes a session between a local network and a UE.

The base station may provide identification information of the integrated UP entity to the AMF such that the SMF may select the integrated UP. The AMF may select the SMF that manages the integrated UP entity, based on the identification information of the integrated UP entity. The AMF may transmit the request for using the integrated mode to the selected SMF.

According to some embodiments, the request for using the integrated mode may include at least one of identification information of an integrated UP entity or a session establishment request between a local network and a UE. In other words, a message regarding the request for using the integrated mode may further include not only information about the request for using the integrated mode for performing communication with the local network through the integrated UP entity, but also at least one of the identification information of the integrated UP entity or the information about the session establishment request with the local network of the UE. In the information about the session establishment request, the identification information of the integrated UP entity may be included.

According to some embodiments, the identification information of the integrated UP entity may be an IP address. According to some embodiments, the identification information of the integrated UP entity may be an IP address of a local gateway (L-GW) or information of a local area data network (LADN).

In operation 640, the SMF may determine based on user information of the UE whether to accept use of an integrated mode.

According to some embodiments, the SMF may obtain the user information from the UDM. The SMF may determine based on the user information whether the UE has an authority to access the local network. Alternatively, the SMF may determine based on the user information whether the UE has an authority to be provided with a specific service by accessing the local network.

According to some embodiments, the SMF may not accept the request for using the integrated mode, when a terminal having no authority to access the local network requests use of the integrated mode. That is, the SMF may reject the request for using the integrated mode.

According to some embodiments, the SMF may not accept the request for using the integrated mode, when a terminal having no authority to access the local network requests use of the integrated mode. That is, the SMF may reject the request for using the integrated mode. When there is no integrated UP entity managed by the SMF, the SMF may reject the request for using the integrated mode.

According to some embodiments, the SMF may accept the request for using the integrated mode, when a terminal having no authority to access the local network requests use of the integrated mode. When the SMF accepts the request for using the integrated mode, the SMF may select the integrated UP entity as a user plane entity in which the session is to be established, as in operation 660. The SMF may select the integrated UP entity, based on the identification information of the integrated UP entity, received from the AMF.

In operation 660, the SMF may select the integrated UP entity as the user plane entity in which the session is to be established, based on a result of the determination.

According to some embodiments, the SMF may select the integrated UP entity based on at least one of a name of the local network, the identification information of the integrated UP entity, the identification information of the integrated UP entity, or location information (e.g., a tracking area (TA)) of the UE.

According to some embodiments, there may be several user plane entities (e.g., an UPF) managed by one SMF and several integrated user plane entities managed by one SMF, such that the SMF may select an integrated UP entity based on a DN name or an access point (AP) name, an address of the integrated UP entity, and the location information of the UE.

In operation 680, the SMF may transmit a session establishment request to the selected integrated UP entity.

According to some embodiments, the SMF may request establishment of a session between the UE and the local network from the selected integrated UP entity in operation 670. The integrated UP entity may generate a session upon receipt of the session establishment request from the SMF.

When the integrated UP entity establishes the session, the integrated UP entity may transmit information about the established session to the SMF. The information about the established session may include resource allocation information. The resource allocation information, which is information about a resource allocated by the integrated UP entity to establish the session, may include, but not limited to, at least one of a tunnel endpoint identifier (TEID) or information (e.g., module address information, module identification information, etc.) about a session-created module among modules included in the integrated UP entity.

The SMF having received the resource allocation information from the integrated UP entity may provide the resource allocation information to the AMF. The AMF may provide the resource allocation information received from the SMF to the base station that may create a radio bearer for transmitting and receiving a session between the UE and the local network in a module in the integrated UP entity in which the session is established.

Figure 7:
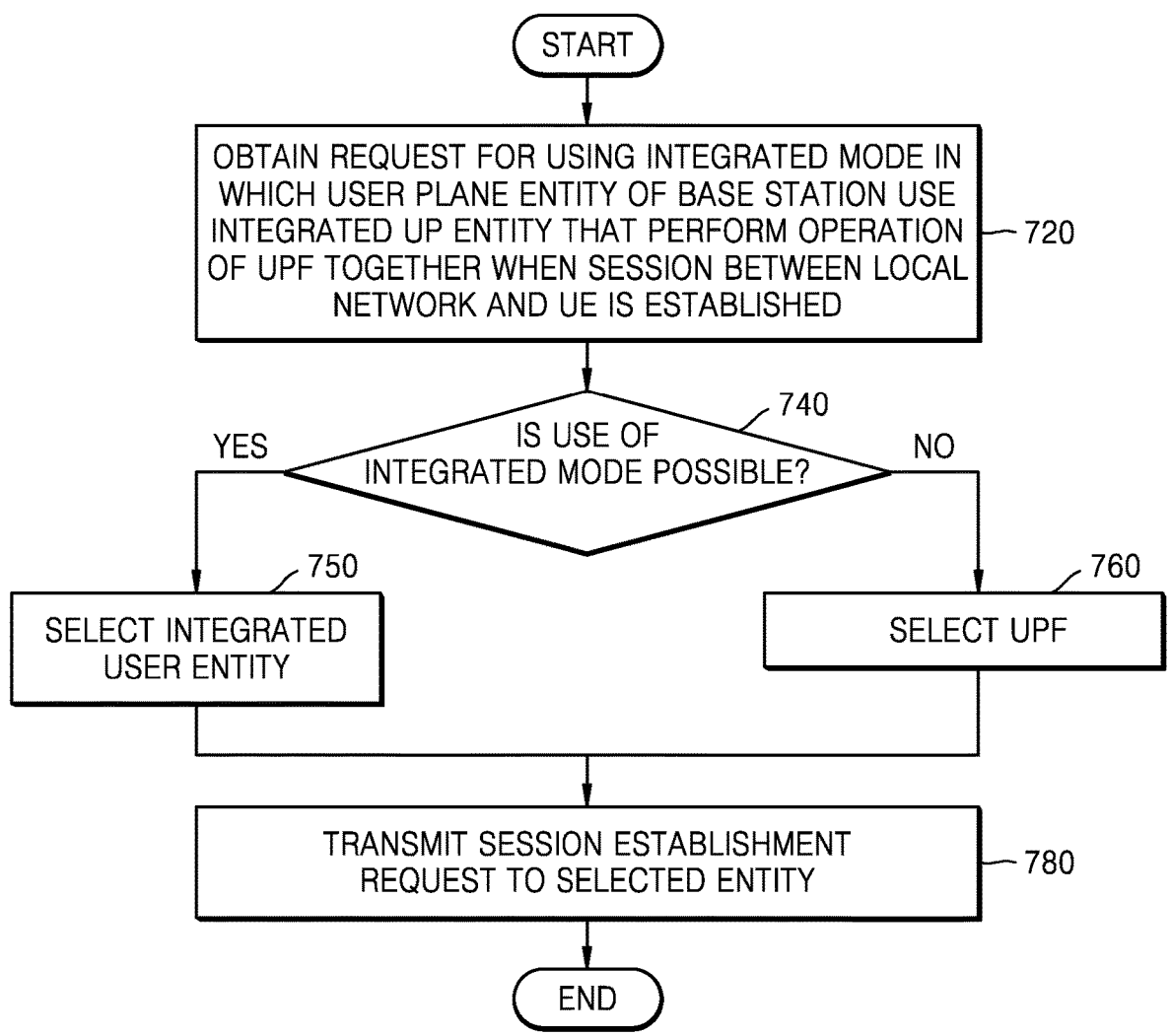
FIG. 7 is a detailed flowchart of a method of establishing a session with a local network of an SMF, according to some embodiments.

FIG. 7 is a detailed flowchart of a method for establishing a session with a local network of an SMF, according to some embodiments.

In operation 720, the SMF may obtain a request for using an integrated mode in which a user plane entity of a base station uses an integrated UP entity that performs an operation of a UPF together, when the SMF establishes a session between a local network and a UE. This may correspond to the description made with reference to FIG. 6 and thus will not be described in detail.

In operation 740, the SMF may determine whether the use of the integrated mode is possible.

As described above with reference to FIG. 6, the SMF may determine based on user information whether the use of the integrated mode is possible. According to some embodiments, the SMF may determine based on address information of the local network whether the use of the integrated mode is possible, and based on identification information of the integrated UP entity whether the use of the integrated mode is possible. For example, when there is no integrated UP entity managed by the SMF, the use of the integrated mode may not be possible.

The SMF may determine based on a location of the UE or mobility of the UE whether the use of the integrated mode is possible. When the location of the UE is changed more frequently than a certain number of times during a certain period (i.e., the mobility of the UE is greater than a certain value), the SMF may reject the request for using the integrated mode received from the UE.

When the SMF determines that the use of the integrated mode is possible, the SMF may select an integrated user entity in operation 750. This may correspond to the foregoing description and thus will not be described in detail.

When the SMF determines that the use of the integrated mode is not possible, the SMF may select an UPF in operation 760.

According to some embodiments, the SMF may select the UPF to control a session to be established through a CN. As described above with reference to FIG. 4, the SMF may select one of the plurality of UPFs to control the UPF to establish a session, and the UE may transmit data to the UPF that may forward the data to the DN.

In operation 780, the SMF may transmit a session establishment request to the selected entity. That is, the SMF may transmit the session establishment request to the UPF or the integrated UP entity based on a result of the determination of whether the use of the integrated mode is possible, and the entity having received the request may establish the session.

Figure 8:
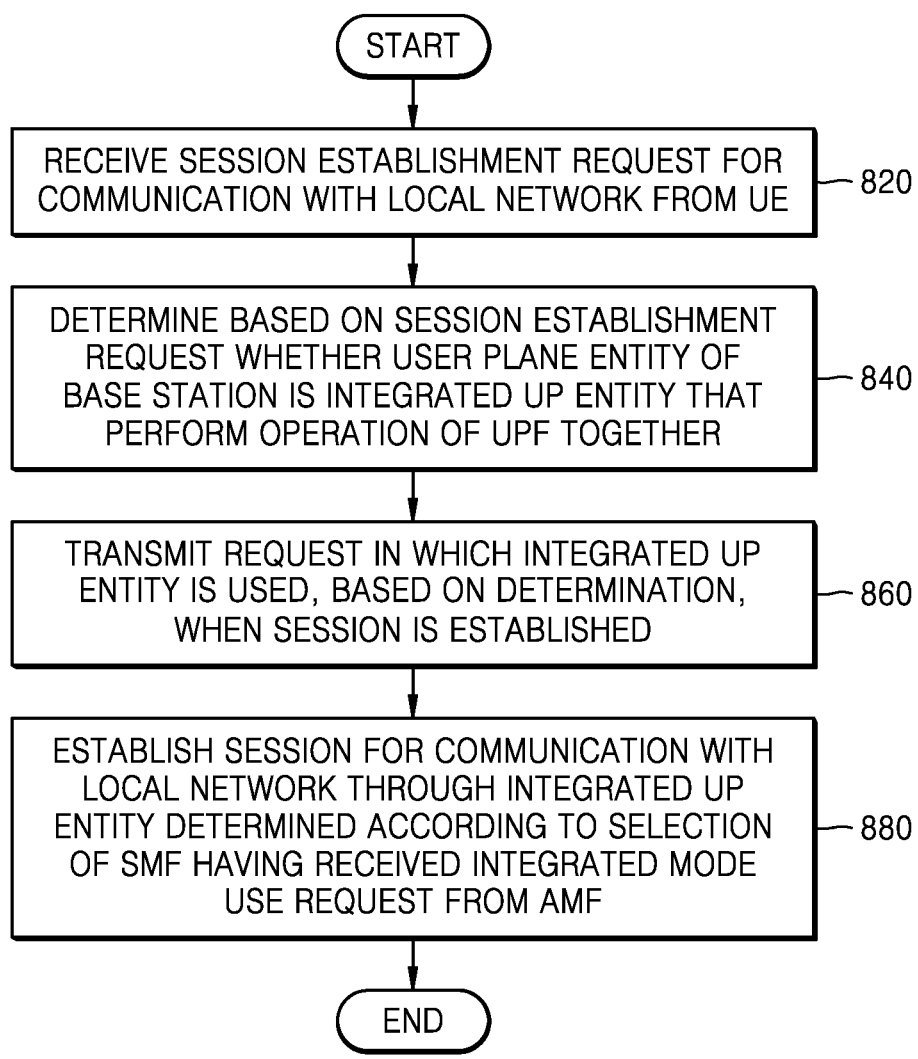
FIG. 8 is a flowchart of a method of establishing a session with a local network of a base station, according to some embodiments.

FIG. 8 is a flowchart of a method for establishing a session with a local network of a base station, according to some embodiments.

In operation 820, the base station may receive the session establishment request for communication with the local network from the UE.

According to some embodiments, a session for communication with the local network may be a session using an LADN or a session using an L-GW.

According to some embodiments, the session establishment request may include any operation for establishing a session. For example, the session establishment request may include, but not limited to, at least one of initial access operations such as an operation, performed by the UE, of obtaining an international mobile subscriber identity (IMSI) including a process such as EPS connection management (ECM) connection establishment from the base station, a subscriber authentication operation, a non-access stratum (NAS) security key configuration operation, or a location registration operation.

In operation 840, the base station may determine based on the session establishment request whether the user plane entity of the base station is an integrated UP entity that performs an operation of the UPF together.

According to some embodiments, the base station may determine whether the user plane (i.e., the RAN UP) included in the base station is the integrated UP entity including a function of the UPF. Alternatively, even when the base station is not a user plane included therein, the base station may determine whether a user plane for establishing a session for communication with the local network is the integrated UP entity including the function of the UPF.

In operation 860, the base station may transmit the request for using the integrated mode in which the integrated UP entity is used, in session establishment, based on the determination.

According to some embodiments, when a session requested by the UE to be established is a session for communication with the local network and the user plane entity of the base station is the integrated UP entity, the base station may transmit the request for using the integrated mode, to the AMF.

According to some embodiments, the request for using the integrated mode may include at least one of identification information of an integrated UP entity or a session establishment request between the local network and the UE.

According to some embodiments, the base station may transmit the identification information of the integrated UP entity such that the core network may select the user plane entity of the base station instead of the UPF as the user plane entity for establishing a session.

According to some embodiments, when a session requested by the UE to be established is not a session for communication with the local network and the user plane entity of the base station is not the integrated UP entity, the base station may transmit the session establishment request, instead of the request for using the integrated mode, to the AMF.

In operation 880, the base station may establish the session for communication with the local network through the integrated UP entity determined according to selection of the SMF having received the request for using the integrated mode from the AMF.

According to some embodiments, the AMF may receive the request for using the integrated mode from the base station. The AMF may select the SMF based on the identification information of the integrated UP entity included in the request for using the integrated mode. According to some embodiments, the AMF may select the SMF that manages the integrated UP entity. The AMF may transmit the request for using the integrated mode to the selected SMF. The SMF may obtain the request for using the integrated mode from the local network and the AMF.

The base station may provide identification information of the integrated UP entity to the AMF such that the SMF may select the integrated UP entity. The AMF may select the SMF that manages the integrated UP entity, based on the identification information of the integrated UP entity. The AMF may transmit the request for using the integrated mode to the selected SMF.

The SMF may determine based on user information of the UE whether to accept use of an integrated mode. According to some embodiments, the SMF may obtain user information from the UDM and determine based on the user information whether the UE has an authority to access the local network. Alternatively, the SMF may determine based on the user information whether the UE has an authority to be provided with a specific service by accessing the local network.

When the SMF accepts the request for using the integrated mode, the SMF may select the integrated UP entity as a user plane entity in which the session is to be established. The SMF may select the integrated UP entity, based on the identification information of the integrated UP entity, received from the AMF.

According to some embodiments, the SMF may select the integrated UP entity based on at least one of a name of the local network, the identification information of the integrated UP entity, or a TA of the UE.

According to some embodiments, there may be several user plane entities (e.g., an UPF) managed by one SMF and several integrated user plane entities managed by one SMF, such that the SMF may select an integrated UP entity based on a DN name or an AP name, an address of the integrated UP entity, and the location information of the UE.

The SMF may transmit a session establishment request to the selected integrated UP entity. That is, the base station may receive the session establishment request from the SMF and may establish a session for communication with the local network through the integrated UP entity determined by the SMF.

When the base station establishes the session, the integrated UP entity may transmit information about the established session to the SMF. The information about the established session may include resource allocation information. The SMF having received the resource allocation information from the integrated UP entity may provide the resource allocation information to the AMF. The AMF may provide the resource allocation information received from the SMF to the base station that may create a radio bearer for transmitting and receiving a session between the UE and the local network in a module in the integrated UP entity in which the session is established.

Figure 9:
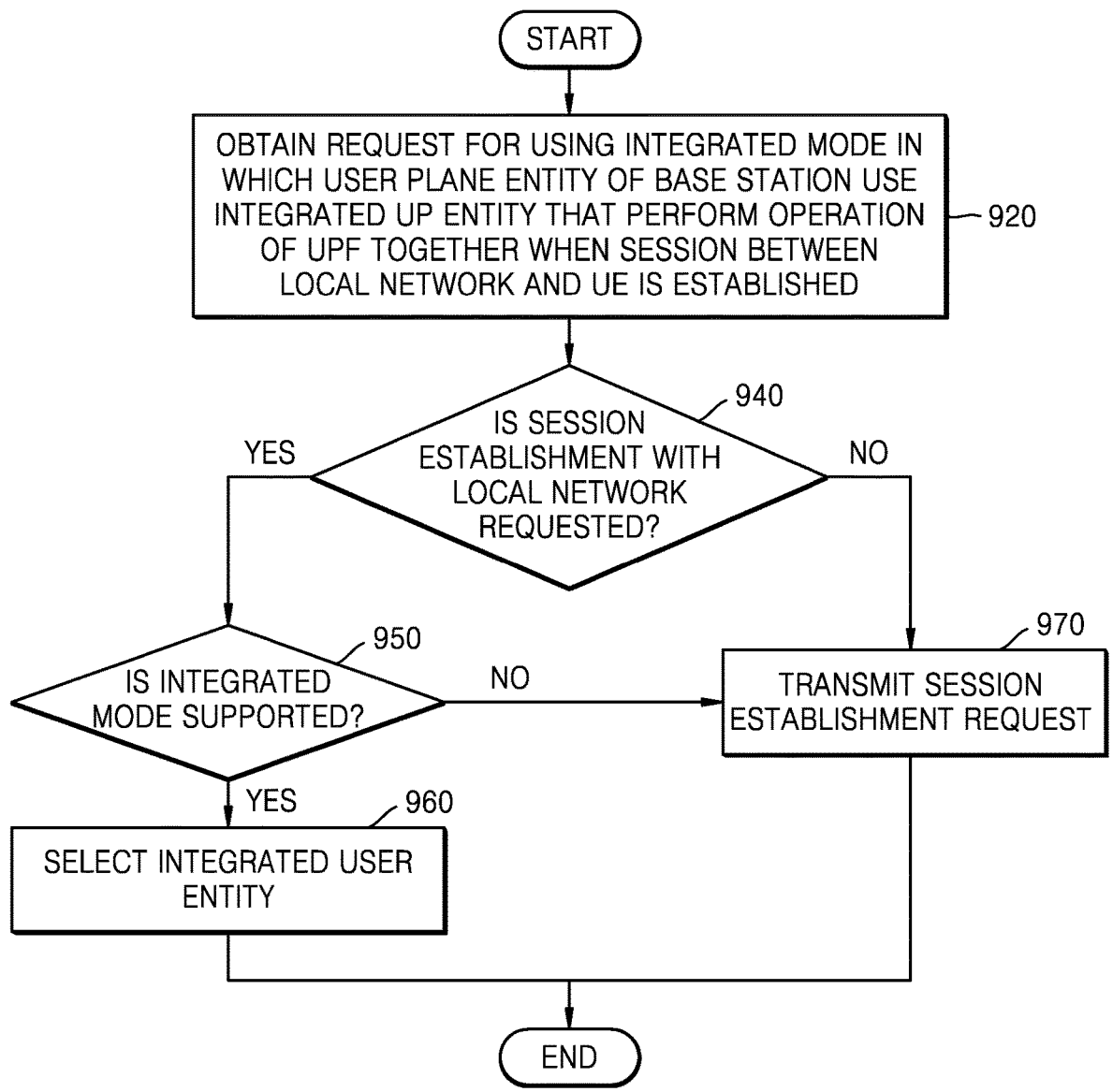
FIG. 9 is a detailed flowchart of a method of establishing a session with a local network of a base station, according to some embodiments.

FIG. 9 is a detailed flowchart of a method for establishing a session with a local network of a base station, according to some embodiments.

In operation 920, the base station may obtain a request for using an integrated mode in which a user plane entity of a base station uses an integrated UP entity that performs an operation of a UPF together, when the SMF establishes a session between a local network and a UE. This may correspond to the description made with reference to FIG. 8 and thus will not be described in detail.

In operation 940, the base station may determine whether session establishment with the local network is requested.

According to some embodiments, the base station may determine whether the UE establishes the session for accessing the local server. According to some embodiments, the base station may determine whether a server the UE desires to access is, as a local server, a server for providing a service provided by a communication operator. According to some embodiments, the base station may determine whether the server the UE desires to access is, as a local server, a server that is accessible without through the CN.

In operation 950, the base station may determine whether the integrated mode is supported.

According to some embodiments, the base station may determine whether the user plane included in the base station includes a function of the UPF. Alternatively, the base station may determine whether the user plane entity that establishes a session for accessing the local server is the user plane entity including the function of the UPF.

In operation 960, the base station may transmit the request for using the integrated mode.

When the UE requests establishment of the session with the local network and supports the integrated mode, the UE may transmit the request for using the integrated mode to the AMF.

That is, the UE may transmit the request for using the integrated mode, including the identification information of the integrated UP entity to establish the session by using the integrated UP entity so as to access the local network without through the UPF or the CN by establishing the session through the integrated UP entity.

In operation 970, the base station may transmit the session establishment request.

When the UE does not request establishment of the session with the local network and does not support the integrated mode, the UE may transmit the session establishment request to the AMF. The session establishment request may not include the identification information of the integrated UP entity.

Figure 10:
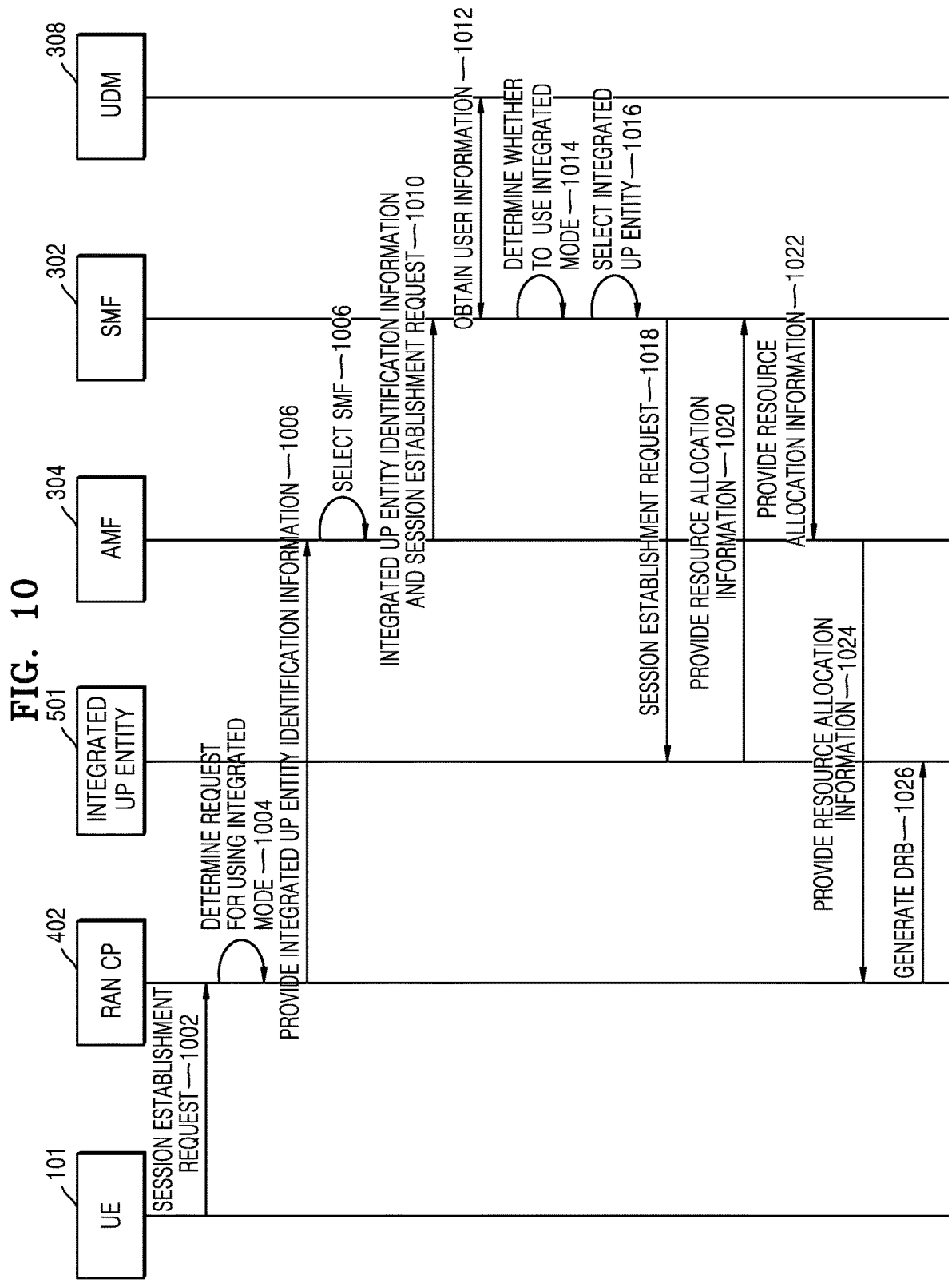
FIGS. 10 and 11 illustrate flows for describing a method of establishing a session with a local network by using an integrated user plane entity, according to some embodiments.
Figure 11:
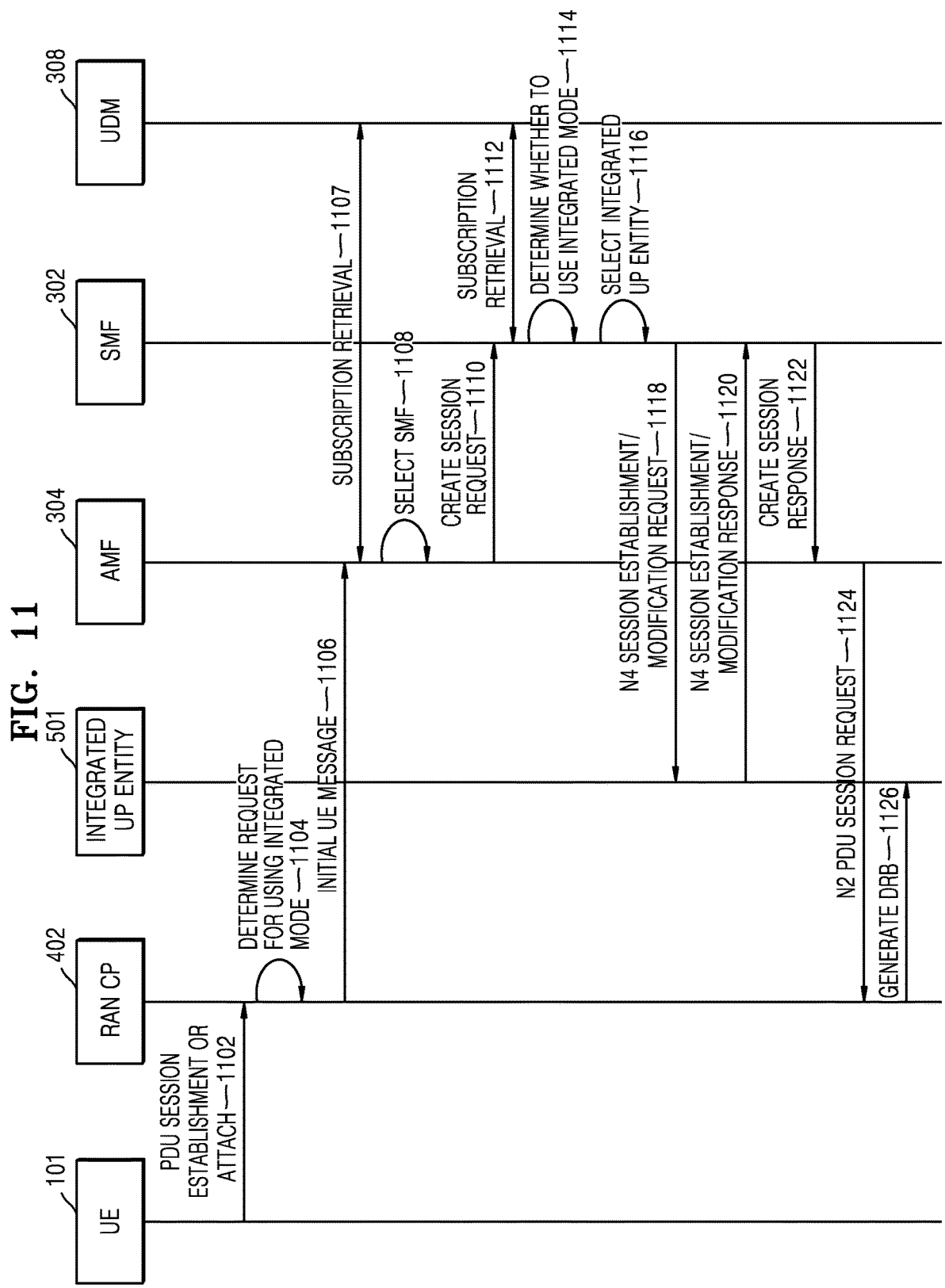

FIGS. 10 and 11 illustrate flows for describing a method for establishing a session with a local network by using an integrated user plane entity, according to some embodiments.

FIG. 10 is a flowchart for establishing a session between the UE 101 and the local network through the integrated UP entity 501. The RAN CP 402 and the integrated UP entity 501 may be distinguishment of the base station as the user plane and the control plane.

In operation 1002, the UE 101 may transmit the session establishment request to the RAN CP 402. As described above, the session establishment request may include various operations for session establishment. For example, the session establishment request may include an operation of obtaining IMSI, an authentication operation, etc., without being limited thereto.

In operation 1004, the RAN CP 402 may determine the request for using the integrated mode. As described above, the RAN CP 402 may determine whether the UE 101 requests establishment of the session for communication with the local server, and the RAN UP is the integrated UP entity 501.

In operation 1006, the RAN CP 402 may provide identification information of the integrated UP entity 501 to the AMF 304. According to some embodiments, the RAN CP 402 may provide identification information of the integrated UP entity 501, together with the request for using the integrated mode, to the AMF 304.

In operation 1008, the AMF 304 may select the SMF 302. According to some embodiments, the AMF 304 may select the SMF 302 that manages the integrated UP entity 501.

In operation 1010, the AMF 304 may transmit the identification information of the integrated UP entity 501 and the session establishment request to the SMF 302 selected in operation 1008.

In operation 1012, the SMF 302 may obtain user information from the UDM 308. According to some embodiments, the user information may include user subscription data such as a charging policy of a user, QoS information, etc.

In operation 1014, the SMF 302 may determine whether to use the integrated mode. As described above, the SMF 302 may determine whether to use the integrated mode, based on the user information obtained from the UDM 308.

In operation 1016, the SMF 302 may select the integrated UP entity 501. When the SMF 302 determines to use the integrated mode, the SMF 302 may select the integrated UP entity 501 as the user plane entity for establishing the session, based on the identification information of the integrated UP entity 501.

In operation 1018, the SMF 302 may request session establishment. According to some embodiments, the SMF 302 may request session establishment from the selected integrated UP entity 501.

In operation 1020, the integrated UP entity 501 may provide resource allocation information to the SMF 302. According to some embodiments, the integrated UP entity 501 may establish the session and provide resource allocation information regarding the established session to the SMF 302. The resource allocation information may correspond to the foregoing description and thus will not be described in detail.

In operation 1022, the SMF 302 may provide the resource allocation information to the AMF 304.

In operation 1024, the AMF 304 may provide the resource allocation information to the RAN CP 402.

In operation 1026, the RAN CP 402 may generate a data radio bearer (DRB). According to some embodiments, the RAN CP 402 may generate the DRB for a module of the integrated UP entity 501 in which the session is established, based on the resource allocation information.

In the related art, an UPF needs to be passed through for an access to a local network, requiring general packet radio service (GPRS) tunneling protocol (GTP)-user plane (GTP-U) encapsulation. However, when the integrated UP entity 501 is used, the UPF does not need to be used to access the local network, skipping GTP-U encapsulation and thus reducing a delay and dispersing traffic.

According to some embodiments, a method for establishing a session for communication with a local network by using the integrated UP entity 501 may be performed using a message for Selected IP Traffic Offload @ Local Network (SIPTO@LN) of LTE or a message used to establish a local area data network (LADN) session of 5G. FIG. 11 is a flowchart illustrating an example of a message transmitted and received between entities.

In operation 1102, the UE 101 may transmit a packet data unit (PDU) session establishment message or a message for attach. According to some embodiments, the PDU session establishment message or the message for attach may be a message for requesting establishment of the session for communication with the local network, and may include messages including other operations for session establishment.

In operation 1004, the RAN CP 402 may determine the request for using the integrated mode. This may correspond to the foregoing description and thus will not be described in detail.

In operation 1106, the RAN CP 402 may transmit an initial UE message to the AMF 304. According to some embodiments, the initial UE message may be a message for attach of the UE. The initial UE message may include at least one of the request for using the integrated mode or the integrated UP entity identification information.

In operation 1107, the AMF 304 may obtain user information from the UDM 308 through subscription retrieval.

In operation 1108, the AMF 304 may select the SMF 302. This may correspond to the foregoing description and thus will not be described in detail.

In operation 1110, the AMF 304 may transmit a create session request to the SMF 302. According to some embodiments, the create session request may include at least one of the identification information of the integrated UP entity 501 or the session establishment request.

In operation 1112, the SMF 302 may obtain the user information from the UDM 308 through subscription retrieval.

In operation 1114, the SMF 302 may determine whether to use the integrated mode.

In operation 1116, the SMF 302 may select the integrated UP entity 501. Operations 1114 and 1116 may correspond to the foregoing description and thus will not be described in detail.

In operation 1118, the SMF 302 may transmit an N4 session establishment/modification request to the integrated UP entity 501. According to some embodiments, the N4 session establishment/modification request may include the session establishment request.

In operation 1120, the integrated UP entity 501 may transmit an N4 session establishment/modification response to the SMF 302.

According to some embodiments, the N4 session establishment/modification response may include resource allocation information regarding the established session. The resource allocation information may correspond to the foregoing description and thus will not be described in detail.

In operation 1122, the SMF 302 may transmit a create session response to the AMF 304. According to some embodiments, the create session response may include resource allocation information.

In operation 1124, the AMF 304 may transmit an N2 PDU session request to the RAN CP 402. According to some embodiments, the N2 PDU session request may include resource allocation information.

In operation 1126, the RAN CP 402 may generate a DRB. This may correspond to the foregoing description and thus will not be described in detail.

Figure 12:
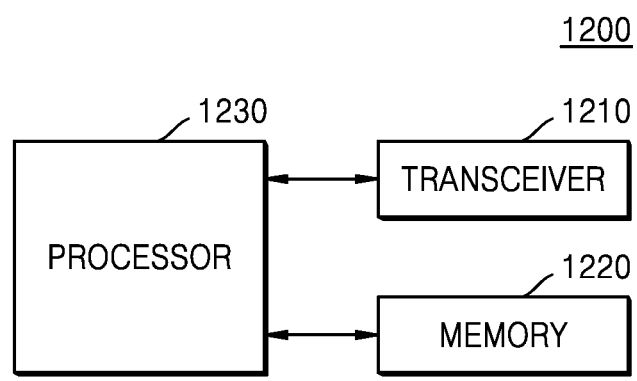
FIG. 12 is a block diagram of an entity included in a wireless communication system, according to some embodiments.

FIG. 12 is a block diagram of an entity 1200 included in a wireless communication system, according to some embodiments.

Referring to FIG. 12, the above-described entities may include a transceiver 1210, a memory 1220, and a processor 1230. That is, all entities of 4G and 5G communication systems described with reference to FIGS. 2 and 3, including the user plane entity and the control plane entity of the base station and the entities of the CN according to the present disclosure may include components of FIG. 12. However, the entities are not limited to the above-described example, and the entity 1200 may include components that are more or less than those illustrated in FIG. 12.

According to some embodiments, the components of the entity 1200, i.e., the transceiver 1210, the memory 1220, and the processor 1230 may be implemented in the form of a single chip or card.

According to some embodiments, the transceiver 1210 may transmit and receive traffic. The transceiver 1210 may also perform communication with a UE, a base station, or other entities, without being limited to the above-described example.

When the entity 1200 of FIG. 12 is an SMF, the transceiver 1210 may obtain a request for using an integrated mode in which an integrated UP entity is used, and transmit a session establishment request to a selected integrated UP entity, in establishment of a session between the local network and the UE. The transceiver 1210 may also receive the request for using the integrated mode from an AMF having received the request for using the integrated mode from the base station. The transceiver 1210 may receive resource allocation information regarding the established session from the integrated UP entity and provide the resource allocation information to the AMF upon receipt of the resource allocation information from the integrated UP entity.

When the entity 1200 of FIG. 12 is the base station, the transceiver 1210 may receive the session establishment request for communication with the local network from the UE and transmit the request for using the integrated mode in which the integrated UP entity is used, to the AMF in session establishment. The transceiver 1210 may also transmit the resource allocation information regarding the established session to the SMF.

According to some embodiments, the memory 1220 may store instructions or a program used to control the processor 1230 and the transceiver 1210. The memory 1220 may also include a database.

According to some embodiments, the memory 1220 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth.

According to some embodiments, the processor 1230 may generally control an overall operation of the entity 1200. For example, the processor 1230 may control the components included in the entity 1200 overall, by executing the program stored in the entity 1200.

When the entity 1200 of FIG. 12 is an SMF, the processor 1230 may determine whether to accept use of the integrated mode based on the user information of the UE, and select the integrated UP entity as the user plane entity in which the session is to be established, based on a result of the determination. The processor 1230 may select the integrated UP entity based on at least one of a name of a local network, identification information of the integrated UP entity, or a TA of the UE.

When the entity 1200 of FIG. 12 is a base station, the processor 1230 may determine based on the session establishment request whether the user plane entity of the base station is the integrated UP entity performing the operation of the UPF together, and establish a session for communication with the local network through the integrated UP entity determined according to selection of the SMF having received the request for using the integrated mode from the AMF. The processor 1230 may also generate a radio bearer that transmits and receives the session for communication between the UE and the local network in the module of the integrated UP entity in which the session is established.

Operations performed by the components of the entity 1200 to establish the session with the local network may correspond to the foregoing description and thus will not be described in detail. Other entities may also operate for execution of the above-described method by each component.

An apparatus according to the present disclosure may a processor, a memory for storing program data and executing it, a permanent storage such as a disk drive, a communications port for communicating with external devices, and user interface devices, such as a touch panel, a key, a button, etc. Methods implemented with a software module or algorithm may be stored as computer-readable codes or program commands executable on the processor on computer-readable recording media. Examples of the computer-readable recording medium include magnetic storage media (e.g., read-only memory (ROM), random-access memory (RAM), floppy disks, and hard disks) and optical recording media (e.g., compact disc-ROM (CD-ROM) and digital versatile discs (DVDs)). The computer-readable recording medium may also be distributed over network coupled computer systems so that a computer-readable code is stored and executed in a distributed fashion. The medium may be read by a computer, stored in a memory, and executed by a processor.

All documents cited in the above description, including published documents, patent applications, and patents, may be incorporated herein in their entirety by reference in the same manner as when each cited document is separately and specifically incorporated or incorporated in its entirety.

Reference numerals have been used in exemplary embodiments illustrated in the attached drawings to help understanding of the disclosure, and particular terms have been used to describe the embodiments of the disclosure, but the disclosure is not limited to the particular terms, and the disclosure may include any element that may be generally conceived by those of ordinary skill in the art.

The disclosure may be represented by block components and various process operations. Such functional blocks may be implemented by various numbers of hardware and/or software components which perform specific functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented as an algorithm executed in one or more processors. Furthermore, the disclosure may employ any number of techniques according to the related art for electronics configuration, signal processing and/or control, data processing and the like. The term "mechanism", "element", "means", or "component" is used broadly and is not limited to mechanical or physical embodiments of the disclosure. The term may include a series of routines of software in conjunction with the processor or the like.

The particular implementations shown and described herein are illustrative examples of the disclosure and are not intended to otherwise limit the scope of the disclosure in any way. For the sake of brevity, electronics according to the related art, control systems, software development and other functional aspects of the systems may not be described in detail. Furthermore, the connecting lines, or connectors shown in the various figures presented are intended to represent exemplary functional relationships and/or physical or logical couplings between the various elements. Moreover, no item or component is essential to the practice of the disclosure unless the element is specifically described as "essential" or "critical".

In the disclosure (especially, in the claims), the use of "the" and other demonstratives similar thereto may correspond to both a singular form and a plural form. Also, when a range is described in the disclosure, the range has to be regarded as including inventions adopting any individual element within the range (unless described otherwise), and it has to be regarded as having written in the detailed description of the disclosure each individual element included in the range. Unless the order of operations of a method according to the disclosure is explicitly mentioned or described otherwise, the operations may be performed in a proper order. The order of the operations is not limited to the order the operations are mentioned. The use of all examples or exemplary terms (e.g., "etc.,", "and (or) the like", and "and so forth") is merely intended to describe the disclosure in detail, and the scope is not necessarily limited by the examples or exemplary terms unless defined by the claims. Also, one of ordinary skill in the art may appreciate that the disclosure may be configured through various modifications, combinations, and changes according to design conditions and factors without departing from the spirit and technical scope of the disclosure and its equivalents.

The invention claimed is:

1. A method of establishing a session for communication with a local network in a wireless communication system, the method comprising:

obtaining a request for using an integrated mode in which a user plane entity of a base station uses an integrated user plane entity that performs an operation of a user plane function (UPF) together, when a session between a local network and a user equipment (UE) is established;

determining, based on user information of the UE, whether to accept use of the integrated mode;

selecting the integrated user plane entity as a user plane entity in which the session is to be established, based on a result of the determining; and transmitting a session establishment request to the selected integrated user plane entity.

2. The method of claim 1, wherein the request for using the integrated mode comprises at least one of identification information of the integrated user plane entity or a session establishment request between the local network and the UE.

3. The method of claim 2, wherein the obtaining of the request for using the integrated mode comprises receiving the request for using the integrated mode from an access management function (AMF) having received the request for using the integrated mode, from the base station.

4. The method of claim 3, further comprising receiving resource allocation information regarding the established session from the integrated user plane entity.

5. The method of claim 4, wherein the transmitting of the session establishment request to the selected integrated user plane entity comprises providing the resource allocation information to the AMF, upon receiving the resource allocation information from the integrated user plane entity.

6. The method of claim 2, wherein the selecting of the integrated user plane entity comprises selecting the integrated user plane entity based on at least one of a name of the local network, the identification information of the integrated user plane entity, or a tracking area (TA) of the UE.

7. A method of establishing a session for communication with a local network in a wireless communication system, the method comprising:

receiving a session establishment request for communication with a local network from a user equipment (UE);

determining, based on the session establishment request, whether a user plane entity of a base station is an integrated user plane entity that performs an operation of a user plane function (UPF) together;

transmitting a request to use an integrated mode in which the integrated user plane entity is used, to an access management function (AMF), based on the determining, when the session is established; and establishing the session for communication with the local network through the integrated user plane entity determined according to selection of a session management function (SMF) having received the request for using the integrated mode from the AMF.

8. The method of claim 7, wherein the request for using the integrated mode comprises at least one of identification information of the integrated user plane entity or a session establishment request between the local network and the UE.

9. The method of claim 8, further comprising generating a radio bearer in a module of the integrated user plane entity in which the session is established, the radio bearer transmitting and receiving the session for communication between the UE and the local network.

10. The method of claim 8, further comprising transmitting resource allocation information regarding the established session to the SMF.

11. A session management function (SMF) for establishing a session for communication with a local network in a wireless communication system, the SMF comprising:
   a transceiver configured to:
      obtain a request for using an integrated mode in which a user plane entity of a base station uses an integrated user plane entity that performs an operation of a user plane function (UPF) together, when a session between a local network and a user equipment (UE) is established, and
      transmit a session establishment request to a selected integrated user plane entity; and
   a processor configured to:
      determine whether to accept use of the integrated mode, based on user information of the UE, and
      select the integrated user plane entity as a user plane entity in which the session is to be established, based on a result of the determining.

12. The SMF of claim 11, wherein the request for using the integrated mode comprises at least one of identification information of the integrated user plane entity or a session establishment request between the local network and the UE.

13. The SMF of claim 12, wherein the transceiver is configured to receive the request for using the integrated mode from an access management function (AMF) having received the request for using the integrated mode, from the base station.

14. A base station for establishing a session for communication with a local network in a wireless communication system, the base station comprising:
   a transceiver configured to:
      receive a session establishment request for communication with a local network from a user equipment (UE), and
      transmit a request for using an integrated mode in which an integrated user plane entity is used, to an access management function (AMF), when the session is established; and
   a processor configured to:
      determine, based on the session establishment request, whether a user plane entity of a base station is an integrated user plane entity that performs an operation of a user plane function (UPF) together, and
      establish the session for communication with the local network through the integrated user plane entity determined according to selection of a session management function (SMF) having received the request for using the integrated mode from the AMF.

15. A non-transitory computer-readable recording medium having recorded thereon a program for executing the method of claim 1 on at least one processor of a computer.

16. A non-transitory computer-readable recording medium having recorded thereon a program for executing the method of claim 7 on at least one processor of a computer.

* * * * *